(12) United States Patent
Christensen

(10) Patent No.: US 8,411,476 B2
(45) Date of Patent: Apr. 2, 2013

(54) CHARGE MODE CONTROL

(75) Inventor: Søren Kjaerulff Christensen, Struer (DK)

(73) Assignee: Bang & Olufsen A/S, Struer (DK)

( * ) Notice: Subject to any disclaimer, the term of this patent is extended or adjusted under 35 U.S.C. 154(b) by 552 days.

(21) Appl. No.: 12/698,381

(22) Filed: Feb. 2, 2010

(65) Prior Publication Data

US 2010/0188870 A1  Jul. 29, 2010

Related U.S. Application Data

(63) Continuation-in-part of application No. 10/595,706, filed as application No. PCT/DK2004/000740 on Oct. 27, 2004, now Pat. No. 7,656,691.

(30) Foreign Application Priority Data

Nov. 6, 2003 (EP) .................................... 03025509

(51) Int. Cl.
*H02M 3/335* (2006.01)
(52) U.S. Cl. .................. 363/80; 363/16; 363/21.02
(58) Field of Classification Search .................... 363/79, 363/16, 21.02, 80, 21.03; 323/288, 286, 323/235
See application file for complete search history.

(56) References Cited

U.S. PATENT DOCUMENTS

| | | | |
|---|---|---|---|
| 4,935,857 A | 6/1990 | Nguyen et al. | |
| 5,680,034 A | 10/1997 | Redl | |
| 5,999,433 A | 12/1999 | Hua et al. | |
| 6,046,914 A | 4/2000 | Lauter | |
| 6,351,401 B1 | 2/2002 | Scheel et al. | |
| 6,396,716 B1 | 5/2002 | Liu et al. | |
| 6,449,172 B2 | 9/2002 | Nagahara | |
| 6,711,034 B2 | 3/2004 | Duerbaum et al. | |
| 2003/0043599 A1 | 3/2003 | Duerbaum et al. | |
| 2007/0171679 A1 | 7/2007 | Nielsen et al. | |
| 2009/0196074 A1* | 8/2009 | Choi | 363/21.02 |

* cited by examiner

*Primary Examiner* — Harry Behm
(74) *Attorney, Agent, or Firm* — Roberts Mlotkowski Safran & Cole, P.C.; David S. Safran

(57) ABSTRACT

An apparatus and a method for converting power from a power input to an DC output voltage or current, which apparatus has a serial resonance converter, where a first feedback circuit is connected from the output terminal to an error amplifier, where the apparatus further has a second feedback circuit with at least one first resistor that is connected to a coil and to ground, which second feed back circuit connects the line between the first resistor and the coil and towards an inverting integrator, the output of which is connected through a second capacitor to a second input at a control circuit. As a result, the oscillating frequency is under influence of a signal that depends on the voltage generated in the resistor connected in serial to the coil or transformer.

5 Claims, 4 Drawing Sheets

CHARGE MODE CONTROL

CROSS-REFERENCE TO RELATED APPLICATION

This application is a Continuation-in-Part of co-pending application Ser. No. 10/595,706, the entirety of which is incorporated herein by reference.

BACKGROUND OF THE INVENTION

1. Field of the Invention

The present invention relates to an apparatus and a method for converting power from a power input to an DC output voltage or current, which apparatus comprises a serial resonance converter containing at least two serial coupled semiconductor switches having a common output terminal connected to at least one first coil which coil can be a part of a transformer having a second winding connected to a rectifier means, which rectifier means has its output connected to output terminals, where a first feedback circuit is connected from the output terminal to an error amplifier, which error amplifier is connected to an input at a control circuit, which output is connected over driver means to the input of the semiconductor switches, where the apparatus further comprises a second feedback circuit where the second feedback circuit is leading a signal from the first coil to an input terminal.

2. Description of Related Art

U.S. Patent Application Publication 2003/043599 describes a DC-DC converter, a regulation method for a DC-DC converter and a switched-mode power supply are proposed. The DC-DC converter comprises an inverter and a primary-side circuit with a transformer whose secondary-side voltage is rectified by at least one rectifier for generating an output DC voltage. To avoid an asymmetrical load, which is in particular exhibited by a different load of the rectifier elements (power semiconductors), an electrical magnitude of the DC-DC converter is measured. This magnitude may, for example, be a primary-side current, a primary-side voltage at a capacitance, or a secondary-side, rectified voltage. From the measurement of the magnitude, a parameter for the symmetry deviation is calculated for which different symmetry measuring methods are proposed. A symmetry regulation arrangement utilizes the drive of the inverter, for example, the duty cycle of the pulse width modulated voltage produced by the inverter to minimize the parameter for the symmetry deviation. This achieves an even distribution of the power over the secondary rectifier elements.

The above mentioned document describes regulation of the switching frequency to keep it clearly above the resonant frequency of the resonant arrangement. The circuit is operating in frequency mode, which leads to a lack of linearity in the relationship between output voltage and output power. The focus in the above mentioned patent application is to avoid an asymmetrical load of the rectifying components, whereas the actual invention is to optimize the output stability by linearizing the feedback.

U.S. Pat. No. 4,935,857 describes a DC to DC series-parallel resonant converter (10) having a plurality of switches (Q1-Q4) which are switched alternatively between on and off states to cause electrical current to flow alternatively in first and second directions through a series-resonant circuit (60) including a variable frequency ramp generator (28) having a reset input (R) for causing an output ramp signal produced at an output to drop to zero in response to each reset signal; a comparator (30) having an input coupled to the output of the ramp signal generator, a second input for controlling the output DC voltage of the series-parallel resonant circuit and an output which changes level each time the ramp signal reaches the magnitude of the second input; a bistable circuit (32) having first and second outputs (Q, Q) for respectively outputting first and second signals, the output signals changing in response to a change in the output signal of the comparator coupled to the input; a pulse generator (26), coupled to the series-parallel resonant circuit for producing an output pulse train with an output pulse occurring each time the flow of current through the series-resonant circuit changes from one of the first and second directions to another of the first and second directions, the output pulses being applied to the reset input of the variable frequency ramp generator to regulate the frequency of the output ramp signal.

The focus in the above mentioned patent is to assure that the switching frequency of the converter is held above the resonance frequency of the serial/parallel converter.

In an apparatus as described in the opening paragraph, it is known to use an integrated circuit L6598 or the like. This integrated circuit comprises a current controlled oscillator which output is connected over driver means to two inverse output terminals, which are directly connectable to the input of semiconductor switches. The oscillator part in L6598 is also connected to the outside through a connecting terminal where this terminal is connected to an external capacitor that together with two internal current controlled current generators set the frequency. An input signal at the integrated circuit is so connected that changes in current through this terminal lead to control of the frequency.

It is achieved that the voltage over the connected capacitor changes in a linear way between two voltage situations. Each time the charge of the capacitor changes its sign in charge current, the oscillator changes its output from a first to a second value, which over the drivers activates and/or deactivates the semiconductor switches. A feedback from the power output is used to control the size of the current used to charge or discharge the capacitor, and thereby, to a change in the frequency of an oscillating system form by extern components. In normal operation, the oscillating frequency oscillates over the resonance frequency of the resonant DC-DC converter, and the first feedback signal leads to a frequency change to a lower frequency nearer the resonance frequency if a higher load is needed. For normal series resonant converter function working above resonant with frequency control, see FIG. 5a.

When using resonant converters close to resonance frequency, the power gain in the DC-DC converter is highly unlinear with gives big problems in design of the first feedback loop.

SUMMARY OF THE INVENTION

A primary object of the invention is to improve and stabilize an output voltage or current having a fast response to a change in load by linearization of the power conversion control in the resonance DC-DC converter.

This can be achieved with an apparatus or method if modified so that the second feedback circuit is connected to the input terminal of the control circuit, which input terminal is connected to at least one capacitor, which capacitor is controlling the switching frequency, which second feedback circuit comprises at least one first resistor, which first resistor is connected to the second coil and to ground, which second feed back circuit connects the line between the first resistor and the second coil and further towards an inverting integrator, from which inverting integrator output is connected through a second capacitor to a second input at the control circuit.

In this way, it can be achieved that the oscillating frequency is under the influence of the signal that depends on the voltage at the resistor connected in serial to the coil or transformer. The voltage at the resistor that is connected to the first coil or transformer depends on the current flowing through the output of the power supply. This means that, at high load, a very powerful signal will be transmitted directly to the input at the oscillator pin in the control circuit. This will change the operation of the circuit into a charge mode operation. As the load on the output is reduced, the influence of the second feedback signal will be reduced, and the influence of the charge mode is reduced and the operation mode changes back into a normal frequency mode of operation. At the start-up of the power supply, there will be no signal at the second feedback circuit, and the whole start-up will take place in normal frequency mode.

With charge mode control, the second feedback loop measures and controls how much charge that is flowing through the resistor in each half period of switching. This charge is much more linear dependant to power than frequency. The fact that the change in charge instead of current and frequency is controlled is an important feature. If charge mode control by adding a second loop, is used, there are still some problems at low load. By using a combination of frequency control and charge mode control, this can be solved.

The output from the inverting integrator is connected to a serial connection to the second capacitor (Cf), which serial connection comprises a second resistor (Rf) serial coupled to a further third capacitor, which output from the inverting integrator is further connected to a fourth capacitor, which fourth capacitor is connected to ground.

The degree of influence can be adjusted by changing the size of the two capacitors, hereby, it can be achieved that the change of operation mode starts its influence on demand, which is defined from the size of the capacitors. The output of the one or two capacitors can be connected to the input terminal of the oscillator part of the control circuit through at least one capacitor and resistor. Hereby, it can be achieved that the signal of the second feedback circuit is reduced to a value that can be used effectively to influence the charging and discharging of the capacitor connected to the oscillator part in the control circuit. This can be important in the design of new power supplies in that a very simple change of a component at a printed circuit board leads to a major change in function of the power supply.

Together with an L6598 or similar circuits, the second feedback needs an extra circuit. It contains an inverting amplifier, which output can be connected to the input terminal of the oscillator part through at least one capacitor and one resistor. Hereby, it can be achieved that the signal of the second feedback is inverted and amplified to a value that can be used effectively to influence the charging and discharging of the capacitor connected to the oscillator pin on the control circuit.

The output of the inverting amplifier can be connected to a serial connection of a resistor and a further capacitor, which serial connection is coupled in parallel to the capacitor. This can influence the characteristics of the signal that is created as a mix of the output from the inverter and amplifier and from the constant current generators placed inside the integrated circuit. These components generate the automatic change between normal frequency-mode and charge-mode.

The invention can also be described as a method for power conversion control in serial resonance switch mode power converters operating in frequency mode at normal operation where a first feedback signal, from the output, is converted to an input to switching means where a second feed back signal is used to influence the charging and discharging of at least one capacitor connected to the oscillating circuit, where by increasing load, the mode of operation is changed into a charge mode control by a second feedback signal, which second feedback signal is based on the actual charging current and thereby change in charge in each half period of switching on the serial resonant resistor.

In this way, it is achieved that the start-up of the power converter takes place as usual in frequency mode, and where light load operation also takes place in this mode. However, if the load increases, an automatic change in the direction of operation in charge mode takes place where a voltage change on the serial resonant capacitor(s), depending on the actual current demand of the output, is used as the feedback signal to the control circuit. Full-time operation in charge mode could be critical because power supplies might have problems with starting in charge mode as no feedback signal occurs in the start-up situation and might have problems with stability in light load. This problem is completely solved by letting the start and light load take place in frequency mode, and only use charge mode operation if the output current increases. Under normal operation, a combination of frequency mode and charge mode is possible where direct charge mode operation only takes place at high load.

Normal frequency control gives a strong nonlinear conversion, which is known from the state of the art. Charge mode has a better linearity, but at low load, it still has a quite nonlinear conversion. Combined frequency control and charge mode, which is described in this patent application, is highly linear at any load.

In the following, the invention is described in detail with reference to the accompanying drawings.

DETAILED DESCRIPTION OF THE INVENTION

Figure 1:
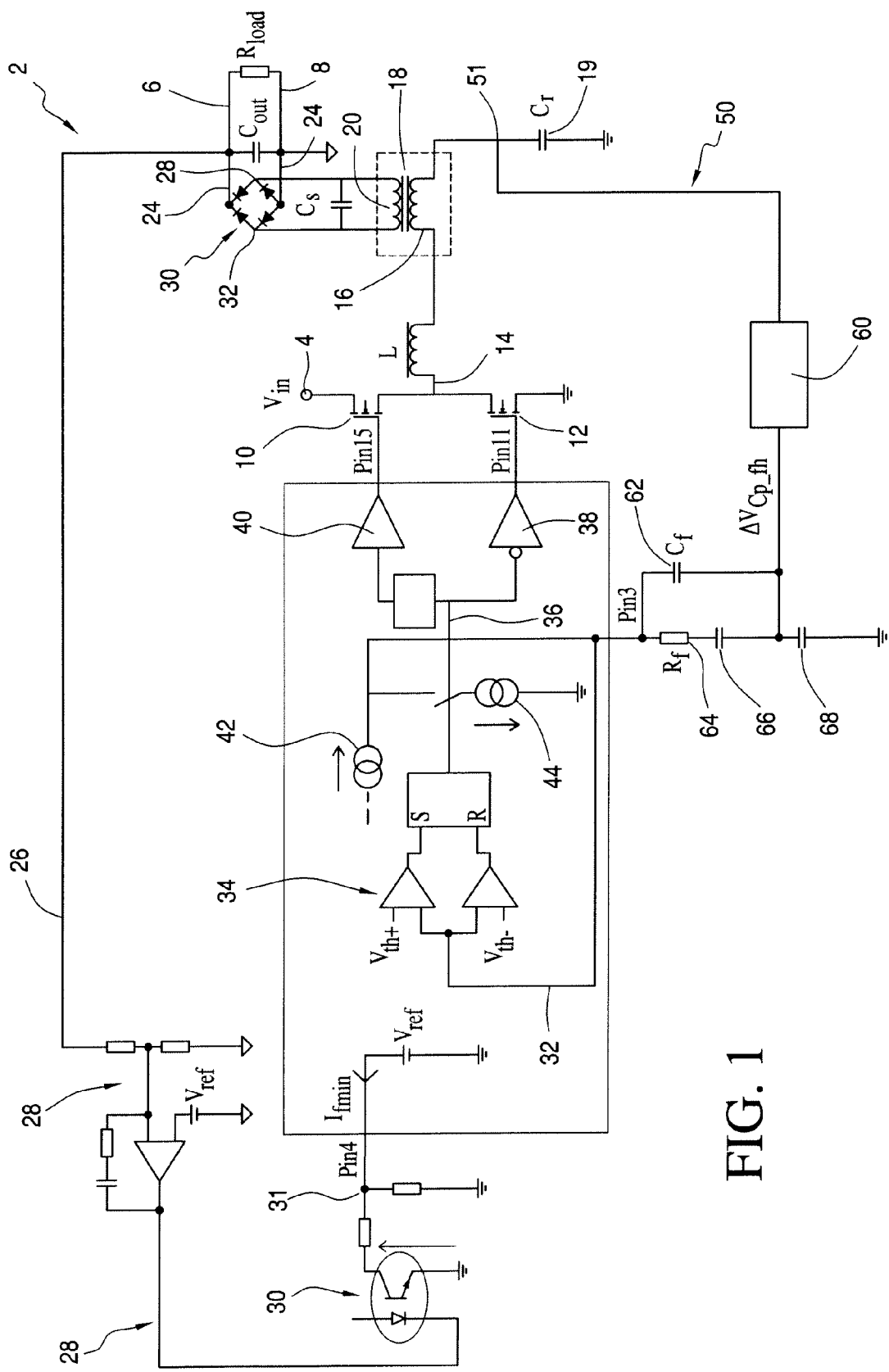
FIG. 1 shows a first embodiment of the invention.

FIG. 1 describes a switch mode power supply 2 having a power input terminal 4 primarily for DC-power, and output terminals 6, 8 between which the power supply can deliver DC-power. Semiconductor switches 10, 12 are connected so that, if switch 10 is open, switch 12 is closed. Hereby, the voltage at the connection point 14 between the two semiconductor switches 10, 12 changes from zero and up to the input DC-voltage. The point 14 is connected to a first coil 15 from where current is flowing to a coil 16, which is part of a transformer 18. The coil 15 can be an integrated part of the transformer 18. The coil 16 is further connected to a capacitor 19. The transformer 18 also contains a coil 20, which is connected to rectifier means, which can be formed as a bridge rectifier 21 having an input terminal 22.

A rectified DC power is delivered at the output 24 towards the output terminals 6, 8, between which a capacitor C-out and a resistor R-load are shown. A feedback signal 26 is connected to the output terminal 6. The feedback signal 26 is sent to an error amplifier 28. The now converted feedback signal 29 is led forwards to electrical isolation means 30 which, in practice, is in the form of an optocoupler. This optocoupler is connected to a pin 4 of the integrated circuit L6598. Inside the integrated circuit 4 is an internal power supply comprising a voltage reference connected to the pin 4. Outside the integrated circuit is the optocoupler connected to the pin 4 through a serial resistor. Also connected to the pin 4 is a resistor that is connected to the ground connection. In this way, all currents between two levels can be generated to flow from the pin 4 depending on the collector voltage on the transistor in the optocoupler 30 so that the feedback signal level defines the current.

A current change in the pin 4 leads to a change in size of the current in the constant current generators 42, 44. This leads to a change of the charging and the de-charging speed of the capacitor 46. As a result, the oscillating frequency is over the switching means 10, 12 and the coil 15. The coil 16 at the transformer and the capacitors 13, 19 is changed according to the load. A switching means 41 defines which of the constant current generators 42, 44 that are to be active. Both cannot be active at the same time. The common output from the two constant current generators 42, 44 is led through a pin 3 at the integrated circuit. The second feedback circuit 50 contains an inverter and amplifier circuit 60, which is necessary if L6598 have to be used. The output of this inverter and amplifier 60 is connected through a capacitor 62 and a resistor 64 to the pin 3 of L6598, which is connected to an oscillator part of the control circuit 34. In parallel to the capacitor 62, a resistor 64 and a capacitor 66 are connected in serial. Furthermore, from the common point of the capacitor 66, the capacitor 62 and the output from the inverter and amplifier 60 are connected to a capacitor 68, which is connected to the ground connection. Charging a capacitor 62 leads to a increase or decrease in voltage over the capacitor 62. In this way, an oscillating voltage is generated at the pin 3 of the integrated circuit. This oscillating signal with a three-angle voltage is led to the input of two comparators and a flip-flop over a line 32. The output flip-flop 36 switches its output depending on the input of the terminal 32 and on a reference voltage. The output of the flip-flop 36 is connected to driving means 38, 40. Output terminals at the integrated circuit are pin 11 and pin 15. Pin 11 has the number 45 and pin 15 the number 43. These are connected to the input of the semiconductor switching means 10, 12.

Figure 2:
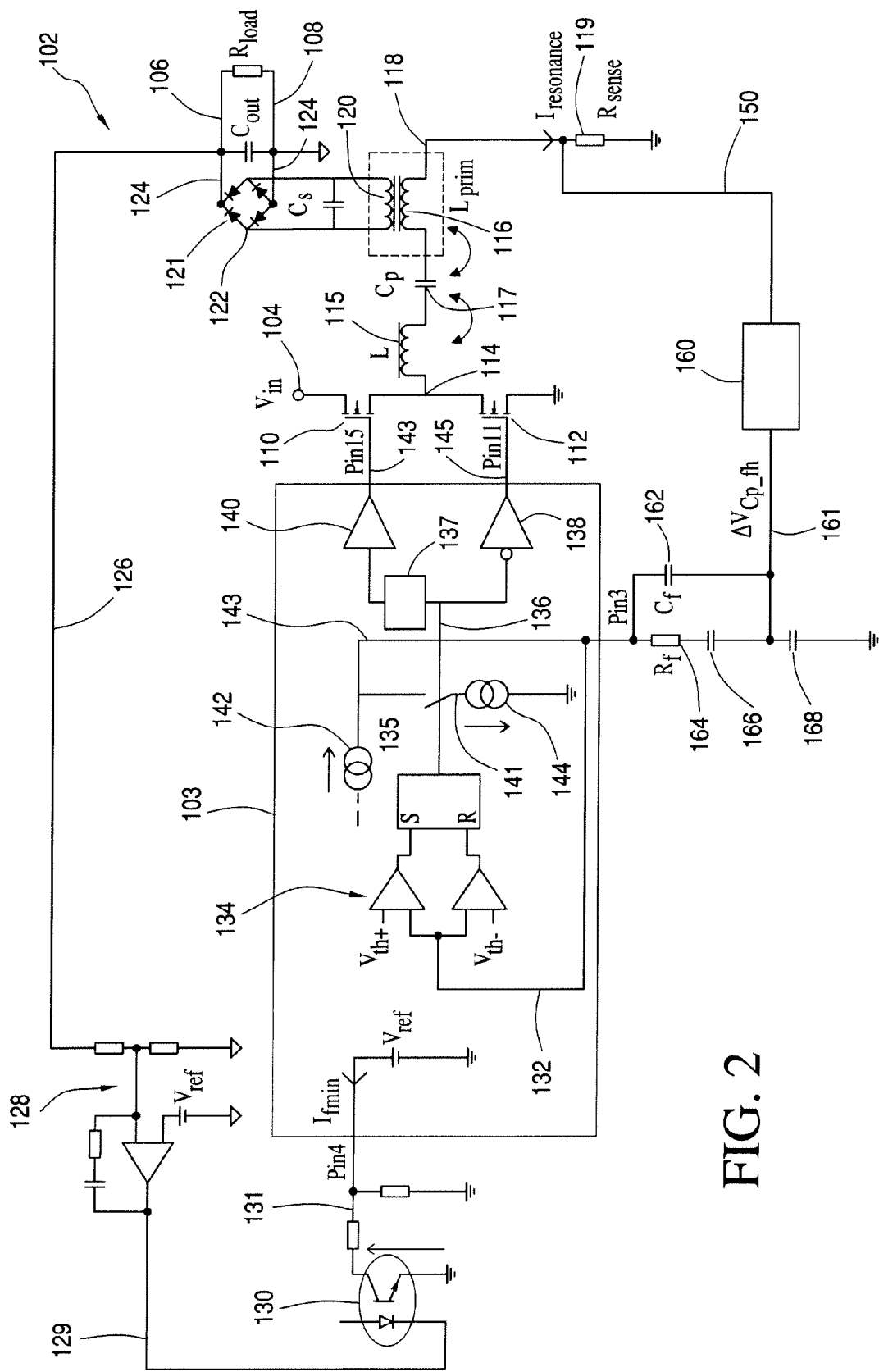
FIG. 2 shows a alternative embodiment of the invention.

FIG. 2 describes a switch mode power supply 102 having a power input terminal 104 primarily for DC-power, and output terminals 106, 108 between which the power supply can deliver DC-power. Semiconductor switches 110, 112 are connected so that, if switch 110 is open, switch 112 is closed. Hereby, the voltage at the connection point 114 between the two semiconductor switches 110, 112 changes from zero and up to the input DC-voltage 104. The mid point 114 between the semiconductor switches is connected to a first coil 115 from where current is flowing through a capacitor 117 to a coil 116, which is part of a transformer 118. The coil 115 can be an integrated part of the transformer 18. The coil 116 is further connected to a resistor 119. The transformer 118 also contains a coil 120, which is connected to rectifier means, which can be formed as a bridge rectifier 121 having an input terminal 122.

A rectified DC power is delivered at the output 124 towards the output terminals 106, 108, between which a capacitor C-out and a resistor R-load are shown. A feedback signal 126 is connected to the output terminal 106. The feedback signal 126 is sent to an error amplifier 128. The now converted feedback signal 129 is led forwards to electrical isolation means 130 which, in practice, is in the form of an optocoupler. This optocoupler is connected to a pin 4 of the L6598 integrated circuit. Inside the integrated circuit 103 is an internal power supply comprising a voltage reference connected to the pin 4. Outside the integrated circuit is the optocoupler 130 connected to the pin 4 through a serial resistor. Also connected to the pin 4 is a resistor that is connected to the ground connection. In this way, all currents between two levels can be generated to flow from the pin 4 depending on the collector voltage on the transistor in the optocoupler 130 so that, the feedback signal level defines the current.

A current change in the pin 4 leads to a change in size of the current in the constant current generators 142, 144. This leads to a change of the charging and the de-charging speed of the capacitor 146. Hereby, the oscillating frequency is over the switching means 110, 112 and the coil 115. The coil 116 at the transformer and the resistor 119 is changed according to the load. A switching means 141 defines which of the constant current generators 142, 144 is to be active. Both cannot be active at the same time. The common output from the two constant current generators 142, 144 is led through a pin 3 at the integrated circuit 103.

The second feedback circuit 150 contains an inverter and integrating circuit 160, which is necessary if an L6598 has to be used. The output 161 of this inverter and integrating circuit 160 is connected through a capacitor 162 to the pin 3 of the L6598, which is connected to an oscillator part of the control circuit 134. In parallel to the capacitor 162, a resistor 164 and a capacitor 166 are connected in serial. Furthermore, from the common point of the capacitor 166, the capacitor 162 and the output 161 from the inverter and amplifier 160 are connected to a capacitor 168, which is connected to the ground connection.

Charging or discharging a capacitor 162 leads to an increase or decrease in voltage over the capacitor 162. In this way, an oscillating voltage is generated at the pin 3 of the integrated circuit 103. This oscillating signal is led over a line 132 to the input of two comparators 134 and a flip-flop 135. The output flip-flop 136 switches its output depending on the input of the terminal 132 and on a reference voltage. The output of the flip-flop 136 is connected to driving means 138, 140. Output terminals at the integrated circuit are pin 11 and pin 15. Pin 11 has the number 145 and pin 15 the number 143. These are connected to the input of the semiconductor switching means 110, 112.

In operation, the inverter and integrator circuit 160 is able to change the shape of the signal 150 into a signal shape that can be added much better to the signal generated at the capacitor 162 and resistor 164 which are connected to the pin 3 of the integrated circuit 103.

An adjustment of the signal is possible by the parallel coupling of the resistor 164 and the capacitor 162, and the further capacitor 168 is connected to the ground connection in changing the size of the components. The 164 and the capacitor 166 form a high pass filter, which has an impedance close to resistor 164 in the whole operating area of the converter. The capacitor 166 is only a DC separation capacitor. In this way, the impedance of capacitors 162, 164, 166 is close to resistor 164 at low frequency operation and close to capacitor 162 at high frequency operation. This gives charge mode control at high load and frequency mode at low load and a soft change between the two modes.

Figure 3:
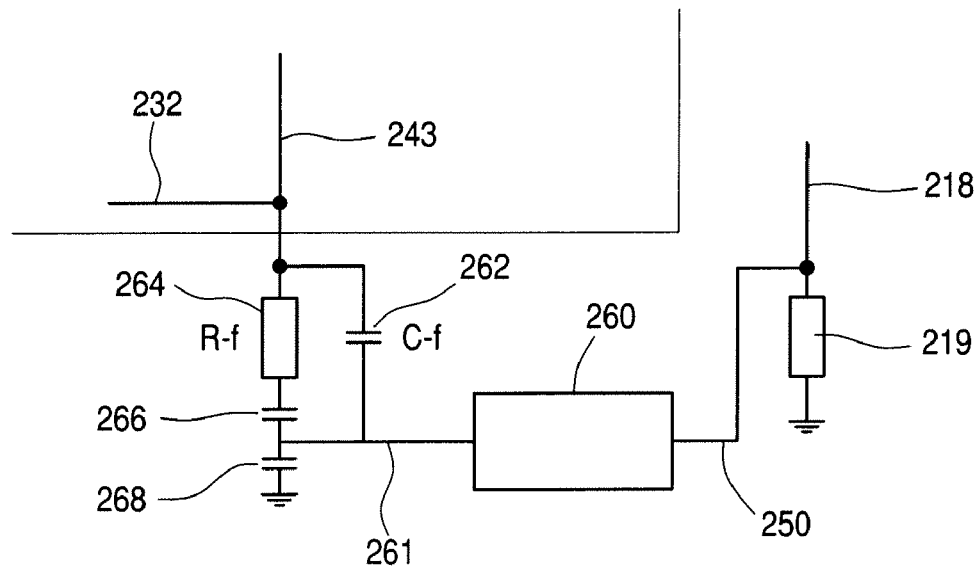
FIG. 3 shows a part of the circuit show at the FIG. 2

FIG. 3 shows a part of the circuit show at the FIG. 2. A resistor 219 is connected by line 218 to the coil 116 shown at the FIG. 2. The current passing the resistor 219 is changed according to the load. The second feedback circuit 250 contains an inverter and integrating circuit 260, which is necessary if L6598 have to be used. The output 261 of this inverter and integrating circuit 260 is connected through a capacitor 262 to the pin 3 of L6598, which is connected to an oscillator part of the control circuit (134 FIG. 2). In parallel to the capacitor 262, a resistor 264 and a capacitor 266 are connected in serial. Furthermore, from the common point of the capacitor 266, the capacitor 262 and the output 261 from the inverter and amplifier 260 are connected to a capacitor 268, which is connected to the ground connection. Charging or discharging a capacitor 262 leads to an increase or decrease in voltage over the capacitor 262.

Figure 4:
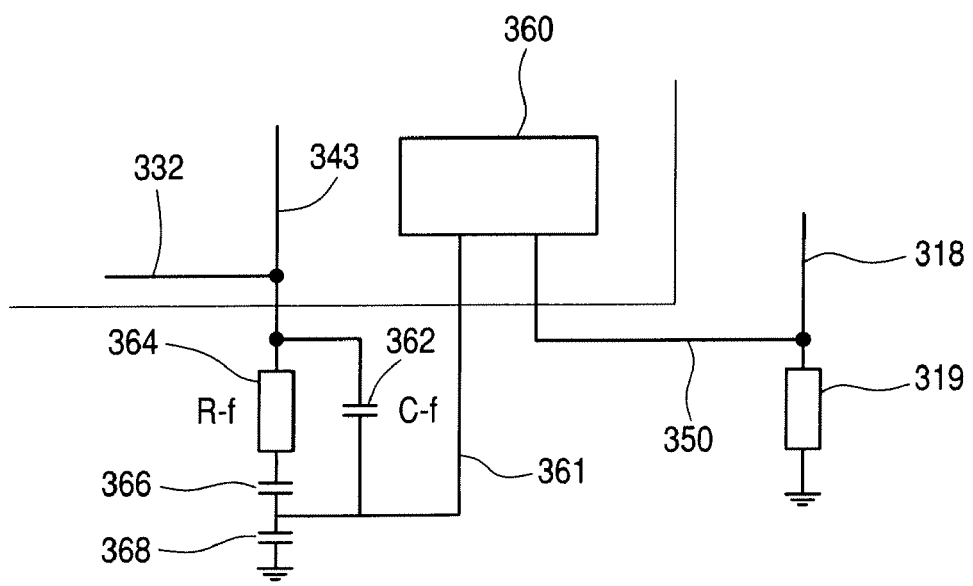
FIG. 4 shows same part of the circuit as the FIG. 3, but the integrator and inverter are part of an integrated circuit.

FIG. 4 shows the same part of the circuit as shown in FIG. 3. A resistor 319 is connected by line 318 to the coil 116 shown at the FIG. 2. The current passing the resistor 319 is changed according to the load. The second feedback circuit 350 contains an inverter and integrating circuit 360, which inverter and integrating circuit is now placed inside an integrated circuit. The output 361 of this inverter and integrating circuit 360 is connected through a capacitor 362 to the pin 3 of the L6598, which is connected to an oscillator part of the control circuit (134, FIG. 2). In parallel to the capacitor 362, a resistor 364 and a capacitor 366 are connected in serial. Furthermore, from the common point of the capacitor 366, the capacitor 362 and the output 361 from the inverter and amplifier 360 are connected to a capacitor 368, which is connected to the ground connection. Charging or discharging a capacitor 363 leads to an increase or decrease in voltage over the capacitor 363.

Figure 5:
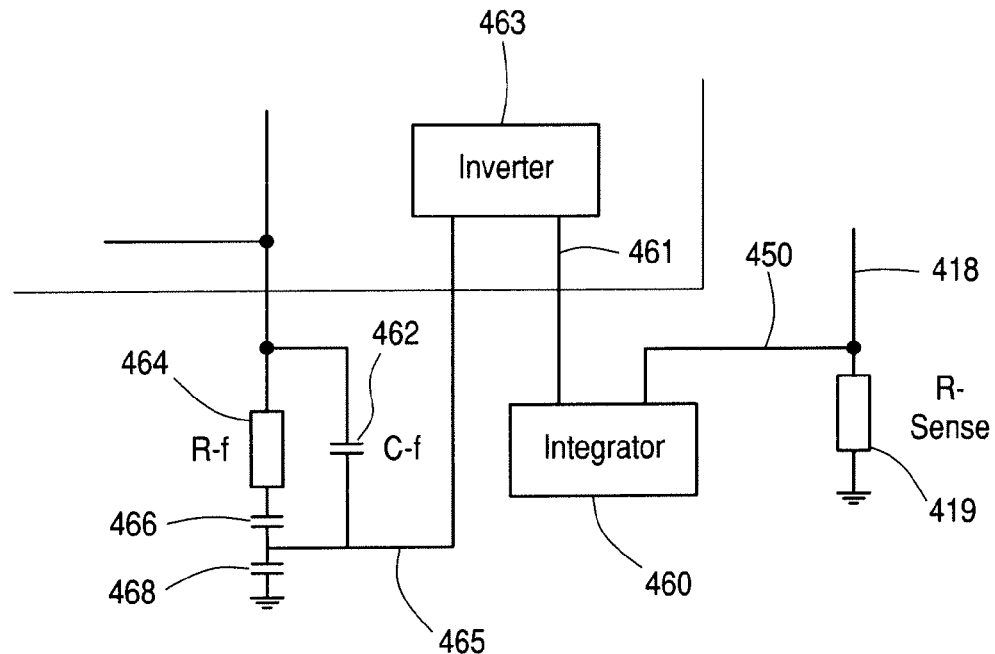
FIG. 5 shows same part of the circuit as the FIG. 4, but the inverter is part of an integrated circuit.

FIG. 5 shows the same part of the circuit as show in the FIG. 4. A resistor 419 is connected by line 418 to the coil 116 shown at the FIG. 2. The current passing the resistor 419 is changed according to the load. The second feedback circuit 450 contains an inverter and integrating circuit 460, which inverter 463 is now placed inside an integrated circuit and the integrator 463 is placed outside the integrated circuit. The output 465 of this inverter and integrating circuit 460 is connected through a capacitor 462 to the pin 3, which is connected to an oscillator part of the control circuit (134 FIG. 2). In parallel to the capacitor 462, a resistor 464 and a capacitor 466 are connected in serial. Furthermore, from the common point of the capacitor 466, the capacitor 462 and the output 461 from the inverter and amplifier 460 are connected to a capacitor 468, which is connected to the ground connection. Charging or discharging a capacitor 463 leads to an increase or decrease in voltage over the capacitor 464.

Figure 6:
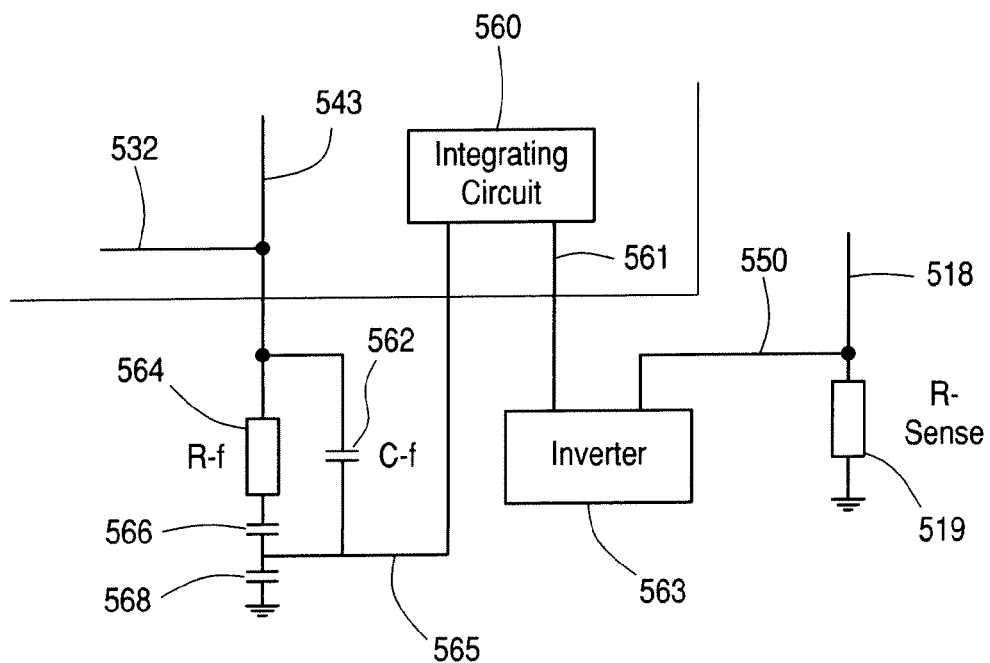
FIG. 6 shows same part of the circuit as the FIG. 5, but the integrator is part of an integrated circuit.

The FIG. 6 shows the same part of the circuit as show in the FIG. 5. A resistor 519 is connected by line 518 to the coil 116 shown in FIG. 2. The current passing the resistor 519 is changed according to the load. The second feedback circuit 550 contains an inverter and integrating circuit 560, which integrator 563 is now placed inside an integrated circuit and the inverter 563 is placed outside the integrated circuit. The output 565 of this inverter 563 and integrating circuit 560 is connected through a capacitor 562 to the pin 3, which is connected to an oscillator part of the control circuit (134 FIG. 2). In parallel to the capacitor 562, a resistor 564 and a capacitor 566 are connected in serial. Furthermore, from the common point of the capacitor 566, the capacitor 562 and the output 561 from the inverter and amplifier 560 are connected to a capacitor 568, which is connected to the ground connection. Charging or discharging a capacitor 563 leads to an increase or decrease in voltage over the capacitor 564.

What is claimed is:

1. Apparatus for converting power from a power input to an output power supply,
    the apparatus comprising:
        a resonance converter, the resonance converter having at least two serially coupled semiconductor switches,
        wherein the semiconductor switches have at least one common output terminal which is connected to at least one first coil,
        wherein the first coil (L) and a first capacitor (Cp),
        and a second coil (Lprim) are serial connected to each other in an arbitrary order,
        wherein the second coil (Lprim) is part of a transformer (T1),
        wherein the transformer (T1) has a third coil connected to rectifier means,
        wherein the rectifier means has an output connected to output terminals,
        wherein a first feedback circuit connects one of the output terminals of the rectifier means to an error amplifier,
        wherein the error amplifier is connected to a first input at a control circuit,
        wherein the control circuit has an output that is connected over driver means to the input of the semiconductor switches,
        wherein a second feedback circuit has at least one first resistor (Rsense) that is connected to the second coil (Lprim) and to ground, connects a line between the first resistor (Rsense) and the second coil (Lprim), and has an inverting integrator with an output that is connected through a second capacitor (Cf) to a second input (Pin-3) of the control circuit, wherein the first resistor (Rsense) constitutes the means for sensing a first current (Iresonans) which current, via the inverting integrator, becomes a controlling charge signal, which signal is output from the inverting integrator.

2. Apparatus according to claim 1, wherein the output from the inverting integrator is connected to a serial connection comprising the second capacitor (Cf), which serial connection further comprises a second resistor (Rf) serial coupled to a third capacitor, the output from the inverting integrator also being connected to a fourth capacitor, which fourth capacitor is connected to ground.

3. Apparatus according to claim 2, wherein the integrator and the inverter are part of an integrated circuit having at least a resonance controller.

4. Apparatus according to claim 2, wherein the inverter is part of an integrated circuit, which integrated circuit comprises at least a resonance controller.

5. Apparatus according to claim 2, wherein the integrator is part of an integrated circuit, which integrated circuit comprises at least a resonance controller.

* * * * *